United States Patent
Martinez

(10) Patent No.: US 10,162,728 B2
(45) Date of Patent: Dec. 25, 2018

(54) METHOD AND DEVICE FOR MONITORING THE EXECUTION OF A PROGRAM CODE

(71) Applicant: STMICROELECTRONICS (ROUSSET) SAS, Rousset (FR)

(72) Inventor: Albert Martinez, Bouc Bel Air (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 118 days.

(21) Appl. No.: 15/222,368

(22) Filed: Jul. 28, 2016

(65) Prior Publication Data

US 2017/0228304 A1    Aug. 10, 2017

(30) Foreign Application Priority Data

Feb. 9, 2016    (FR) ...................................... 16 51001

(51) Int. Cl.
    *G06F 11/00*     (2006.01)
    *G06F 11/36*     (2006.01)
    *G06F 9/30*      (2018.01)

(52) U.S. Cl.
    CPC ...... *G06F 11/3612* (2013.01); *G06F 9/30145* (2013.01); *G06F 11/3664* (2013.01)

(58) Field of Classification Search
    CPC combination set(s) only.
    See application file for complete search history.

(56) References Cited

U.S. PATENT DOCUMENTS

| | | | |
|---|---|---|---|
| 6,629,022 B1 * | 9/2003 | Gessner | G05B 19/042 701/1 |
| 8,495,734 B2 | 7/2013 | Bancel et al. | |
| 9,703,687 B2 * | 7/2017 | Shani | G06F 11/3672 |
| 2004/0153825 A1 * | 8/2004 | Morimoto | G06F 11/3624 714/38.13 |
| 2006/0242627 A1 * | 10/2006 | Wygodny | G06F 11/3636 717/128 |
| 2008/0060072 A1 * | 3/2008 | Saito | G06F 21/52 726/22 |
| 2009/0278667 A1 * | 11/2009 | Huang | G06F 9/445 340/10.51 |
| 2015/0220456 A1 | 8/2015 | Fel | |
| 2016/0232050 A1 | 8/2016 | Sonnekalb et al. | |

FOREIGN PATENT DOCUMENTS

| | | |
|---|---|---|
| DE | 102005050767 A1 | 4/2007 |
| DE | 102014117971 A1 | 6/2016 |
| DE | 102015202049 B3 | 8/2016 |
| WO | 03019353 | 3/2003 |
| WO | 2008075166 A1 | 6/2008 |

* cited by examiner

*Primary Examiner* — Amine Riad
(74) *Attorney, Agent, or Firm* — Slater Matsil, LLP

(57) ABSTRACT

A method for monitoring the execution of a program code by a monitoring program code may include storing instructions of the program code and instructions for monitoring the program code in the same program memory. Each instruction to be monitored and the associated monitoring instructions may be simultaneously extracted from the program memory, and the instruction to be monitored and the monitoring instructions may be executed.

20 Claims, 3 Drawing Sheets

METHOD AND DEVICE FOR MONITORING THE EXECUTION OF A PROGRAM CODE

CROSS REFERENCE TO RELATED APPLICATION(S)

This application is a translation of and claims priority benefit of French patent application number 1651001, filed on Feb. 9, 2016, entitled "Method and device for monitoring the execution of a program code," which is hereby incorporated by reference to the maximum extent allowable by law.

TECHNICAL FIELD

Various embodiments and their implementation relate to the monitoring of the execution of a program code by a monitoring program, in particular, a monitoring program implemented in a processor distinct from the processor executing the program code to be monitored.

The embodiments may be applicable to the monitoring of the execution of skip instructions, such as for example jump instructions.

BACKGROUND

A skip instruction is an instruction which, during the execution of a program code stored in a memory, makes the reading of the program go from a first instruction to a second instruction situated in a memory location whose address does not directly follow the address of the first instruction. During the running of the program code, execution errors may occur, either due to an error in the storing of the program code in the memory, or to an incorrect reading of one of the instructions of the program code, or due to the injection of errors by an external attacker.

Techniques for monitoring the execution of a program code are known, such as, for example, those described in the international Patent Application Publication No. WO2008075166A1 allowing the correct execution of the jump instructions to be verified, and an error signal to be generated in the opposite case.

SUMMARY

According to embodiments described in the present application, the execution of the instructions and the monitoring of their execution are controlled by the same central processing unit, which implies a modification of the software of the central processing unit to incorporate the monitoring code into it. Moreover, it may be preferable for the central processing unit not to monitor itself.

Thus, according to one embodiment, a device and a method are provided for monitoring the execution of a program code in which the monitoring code may be executed by a monitoring unit distinct from the processing unit. The execution of the monitoring code may not require a specific management of the access to the memory storing the program code to be monitored.

According to an embodiment, a method is provided for monitoring the execution of a program code by a monitoring program code in which the program code is stored in a memory that includes memory locations each capable of storing at least one instruction word of the program code and having a storage capacity larger than the size of the instruction words of the program code. For each memory location that includes at least one instruction of the program code to be monitored, at least a part of a monitoring instruction of the monitoring program code is stored in the free part of the memory location that includes the at least one instruction to be monitored.

The at least one instruction to be monitored and the at least a part of the monitoring instruction are simultaneously extracted from the program memory. The at least one instruction to be monitored and the monitoring instruction are executed.

Thus, the program code to be monitored and the monitoring code are stored in the same memory, with the monitoring instructions included, at least in part, within the same memory words as those including the instructions to be monitored. A synchronized extraction of the instructions to be monitored and of the monitoring instructions is therefore obtained, and it then becomes, for example, possible to execute the program code and the monitoring code by two different central processing units, without resorting to a specific arbitration for the access to the memory. On one hand, this may avoid having to modify the software of a single processing unit, and, on the other hand, a synchronous execution of the program code and of the monitoring code is obtained.

The monitoring instruction may have a size larger than the size of the free part. In this case, a first part of the monitoring instruction may be stored in the free part of the memory location including the at least one instruction to be monitored. A second part of the monitoring instruction may be stored in the free part of at least one memory location preceding the memory location including the at least one program code instruction to be monitored.

According to one embodiment, the memory location including the at least one instruction to be monitored may include several instruction words. Information designating the at least one instruction to which the monitoring instruction relates can be stored in the free part of at least one memory location preceding the memory location including the at least one program code instruction to be monitored.

At least a part of another instruction of the monitoring code may be stored in a memory location situated at an address following that of the memory location that includes the at least one program code instruction to be monitored, the instruction to be monitored being for example a jump instruction pointing to the following memory location.

According to another aspect, a device is provided for monitoring a program code by a monitoring program code. According to a general feature of this aspect, the device may include a memory that includes memory locations each capable of storing at least one instruction word of the program code and having a storage capacity larger than the size of the instruction words of the program code. Each memory location includes a free part capable of storing at least a part of a monitoring instruction of the monitoring program code. The device may include means, for example, circuitry and/or instructions for simultaneous extraction of the at least one instruction to be monitored and of the at least a part of the monitoring instruction. The device may also include circuitry and/or instructions for simultaneous executions of the instruction to be monitored and of the at least a part of the monitoring instruction.

The monitoring instruction may have a size larger than the size of the free part, and the free part of the memory location including the at least one instruction to be monitored may be capable of receiving a first part of the monitoring instruction. The free part of a memory location preceding the memory location including the at least one program code instruction to be monitored may be able to include a first part of the monitoring instruction.

According to one embodiment, the memory location including the at least one instruction to be monitored may include several instruction words. The free part of at least one memory location preceding the memory location that includes the at least one program code instruction to be monitored then includes information designating the at least one instruction to which the monitoring instruction relates.

A memory location situated at an address, following that of the memory location that includes at least one program code instruction to be monitored, may be able to include at least a part of another instruction of the monitoring code. The instruction to be monitored being a jump instruction pointing to the following memory location.

DETAILED DESCRIPTION

Figure 1:
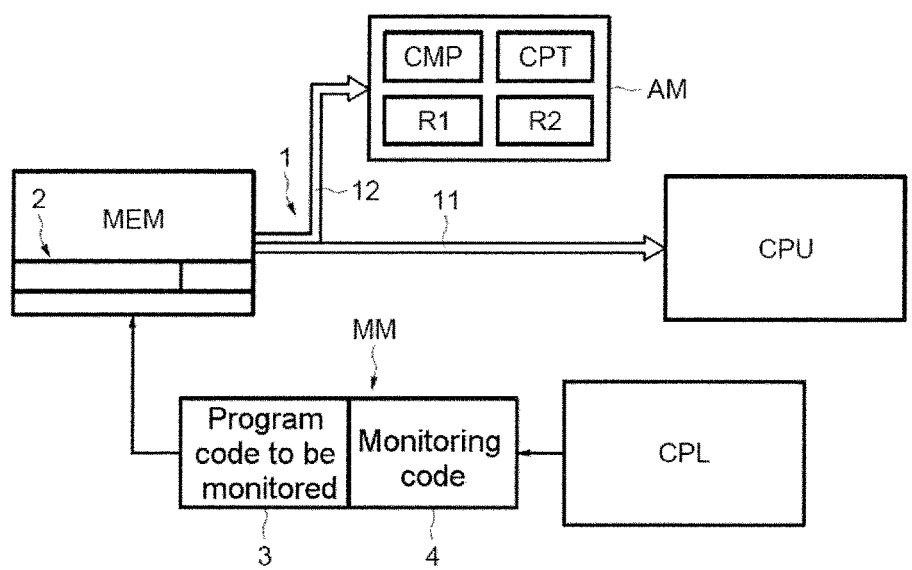
FIG. 1 is a schematic block diagram of a data processing system according to an embodiment.

Referring to FIG. 1, the monitoring unit AM includes, in this example, two registers R1 and R2, a counter CPT able to be reset to a value T and to be decremented at the cadence of a clock signal, and a comparator CMP configured for comparing the contents of the two registers R1 and R2 at the expiration of the period T (when the value of counter reaches 0). This period T notably depends on the pipeline architectures of the various processors and is greater than the time for the processor CPU to execute an instruction extracted from the memory MEM.

The memory MEM is coupled to the central processing unit CPU and to the monitoring unit AM via a data BUS 1. For example, the BUS 1 may be a parallel BUS of thirty-two bits, a first portion 11 of which, for example of twenty-eight bits, is coupled to the processing unit CPU, and a second portion 12 of which, here, of four bits, is coupled to the monitoring unit AM.

Conventionally, during the compilation of a source code, the compiler analyzes the syntax of the source code of the program and defines an intermediate code in which it defines instructions to be monitored, for example instructions for a conditional address jump (for example the instruction "JRZ" in assembler language) or an absolute address jump (for example the instruction "JMP" in assembler language), without these examples being limiting. Subsequently, the intermediate code is converted into executable program code.

The compiler defines, in parallel, the instructions of the monitoring code. For each definition of an address jump instruction, the compiler defines instructions 4 for monitoring the execution of the program code.

The compiler CPL is configured for associating with each program code instruction 3 to be monitored at least a part of a monitoring instruction 4, and for grouping the instruction to be monitored 3 and the part of the monitoring instruction 4 into a memory word MM to be stored in a memory location 2. The size of the memory word MM is therefore larger than the size of a program code instruction to be monitored.

As will be seen in more detail hereinafter, for each instruction to be monitored, for example a conditional address jump instruction of the "JMP" type or absolute address jump instruction of the "JRZ" type, the compiler may associate an instruction of the "WRITE R1" type, corresponding to the writing of a reference value into the register R1. In the case of a conditional address jump instruction, the compiler CPL then defines, subsequent to this instruction, an instruction of the CLEAR R1 type corresponding to the resetting of the register R1, in a memory word to be stored in a memory location directly following the memory location that includes the instruction to be monitored. If this instruction is too large, the compiler can separate it into two parts, and place one of the parts into another memory word intended to be stored for example in the preceding memory location.

Similarly, knowing the address of the memory location pointed to by the address jump instruction, the compiler defines for the address pointed to another monitoring instruction of the WRITE R2 type corresponding to the writing of a reference value into the register R2, that it places in the memory word intended to be stored at the address pointed to by the jump instruction. The program code and the monitoring code are subsequently stored in the memory locations of the program memory MEM. Each memory location therefore has a size larger than the size of a monitoring instruction.

Figure 2:
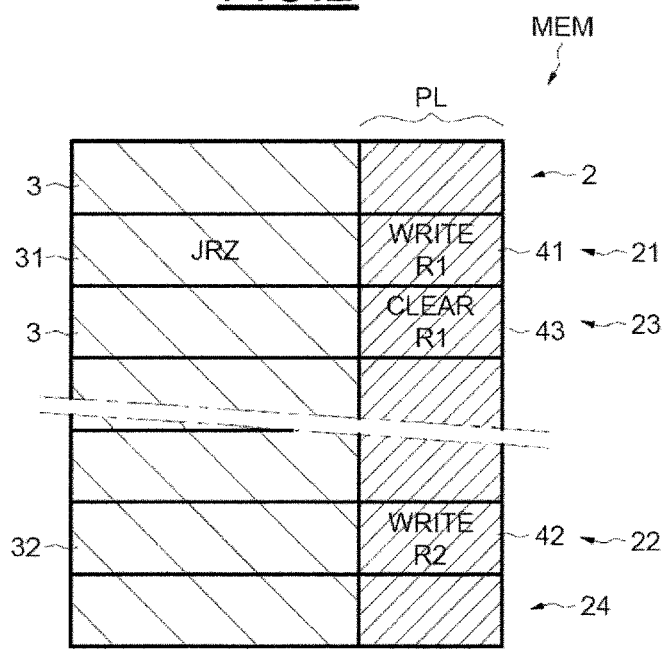
FIG. 2 is a diagram of a memory of a data processing system illustrating memory locations according to an embodiment.

In the following part of the description, one example of the running of the monitoring program will be described in more detail. The memory MEM, as illustrated in FIG. 2, includes memory locations 2 each configured for storing a memory word that includes at least one instruction word 3 of an executable program code.

The memory locations have a size of thirty-two bits, for example. The instruction words 3 have a size of twenty-eight bits, thus leaving a free part PL of four bits in each memory location. This free part PL is used for storing, as described hereinbefore, monitoring instructions 4 associated with instructions to be monitored.

In this example, a first memory location 21 includes a memory word that includes a first instruction word 31 corresponding to a conditional address jump instruction, and a first monitoring instruction 41 relating to the first instruction word 31.

The first monitoring instruction 41 corresponds to the writing of a reference value into the register R1, for example the writing of the value one. The address jump instruction 31 points to a second memory location 22, including a memory word that includes a second instruction word 32, not monitored, and a second monitoring instruction 42 relating to the jump instruction 31. The second monitoring instruction 42 corresponds to the writing of the reference value into the register R2.

A third memory location 23, whose address directly follows that of the first memory location 21, includes a memory word that includes a third monitoring instruction 43 corresponding to resetting the register R1 to its initial value stored in the free part PL of the third memory location 23.

Figure 3:
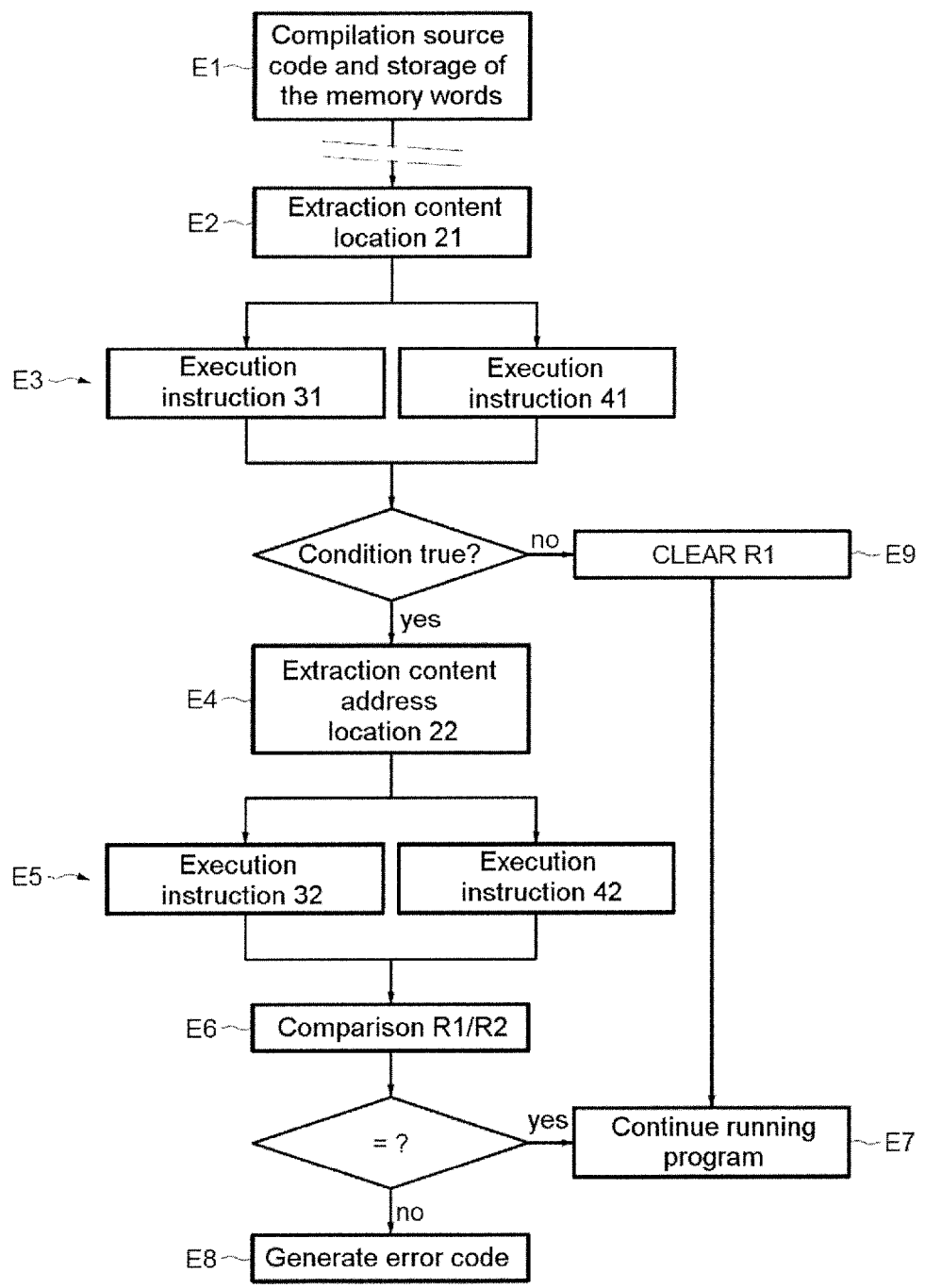
FIG. 3 is a flow chart of a method for monitoring the execution of a program code according to an embodiment.

FIG. 3 schematically illustrates the various steps of one embodiment. In the step E1, the source code and the monitoring code are compiled as described hereinbefore, and the memory words thus obtained are stored in the memory locations 2 of the memory MEM. Thus, each memory location 2 includes one instruction of the program code, and the memory locations that include instruction words to be monitored each include one instruction of the monitoring code 4 stored in the parts unused by the instruction words 3 of the program code (or free parts PL).

The storing is carried out in such a manner that at the end of the step E1, the memory MEM is in the configuration previously described and illustrated in FIG. 2. The content of the first memory location 21 is subsequently extracted (step E2).

It should be noted that step E2 does not necessarily directly follow the step E1. Thus, prior to step E2, other steps which correspond to a conventional execution of the program code included in other memory locations 2 could have taken place, but are not described for the sake of simplification.

The first twenty-eight bits of the first memory location 21, in other words the jump instruction 31, are extracted towards the central processing unit via the first portion 11 of the bus 1, and the four remaining bits, which correspond to the first monitoring instruction word 41, are extracted towards the monitoring unit via the second portion 12 of the bus 1. Thus, the extractions of the instruction word 31 of the program code and of the first monitoring instruction 41 are carried out simultaneously and in a synchronized manner.

Similarly (step E3), the execution of the program code instruction 31 by the central processing unit CPU, and the execution of the monitoring instruction 41 by the monitoring unit AM are carried out in parallel. During the execution of the first monitoring instruction 41, which corresponds here to the writing by the monitoring unit AM of the reference value into the first register R1, the monitoring unit AM triggers the decrementation of the counter CPT.

During the execution of the conditional jump instruction, two different scenarios may apply. The first scenario corresponds to the case where the jump condition of the conditional instruction is not true. In this case, the jump of addresses does not take place, and the execution of the program continues with the extraction and the execution (step E9) of the content of the third memory location 23, which directly follows the first memory location.

Step E9 also includes the execution of the third monitoring instruction 43, which corresponds to a reset of the value of the register R1 to its initial value, for example a reset to zero. The monitoring unit then halts the decrementation of the counter CPT and resets it. The execution of the program code then continues (step E7) in a conventional manner.

The second scenario corresponds to the case where the jump condition of the conditional jump instruction is true. Then, the execution of the program code continues at the second memory location 22. The decrementation of the counter CPT is not halted by the monitoring unit AM.

Step E4 corresponds to the extraction of the content of the second memory location 22. As previously described, the first twenty-eight bits corresponding to the second program code instruction 32, not monitored, are extracted towards the central processing unit CPU, and the four remaining bits corresponding to the second monitoring instruction 42 are extracted towards the monitoring unit AM, the two extractions taking place simultaneously.

The processing unit CPU executes the second program code instruction 32, and the monitoring unit AM executes the second monitoring instruction 42. The monitoring unit AM therefore writes the reference value into the second register R2. In the case of a normal running of the program, the two registers R1 and R2 therefore comprise the same reference value.

At the end of the countdown of the counter CPT, the comparator CMP of the monitoring unit compares (step E6) the values of the two registers R1 and R2. If the two values are equal, then the jump instruction has indeed been executed, and the program continues its execution (step E7). If the values are not equal, then the execution did not run normally and the monitoring unit then generates an error (step E8).

For example, during the execution of the jump instruction 31, the program could jump to an incorrect memory location 24 because of a spurious malfunction or a modification of the program code by an external attacker. Since the incorrect memory location 24 does not include the second monitoring instruction 42, the second register R2 would not include the reference value.

Figure 4:
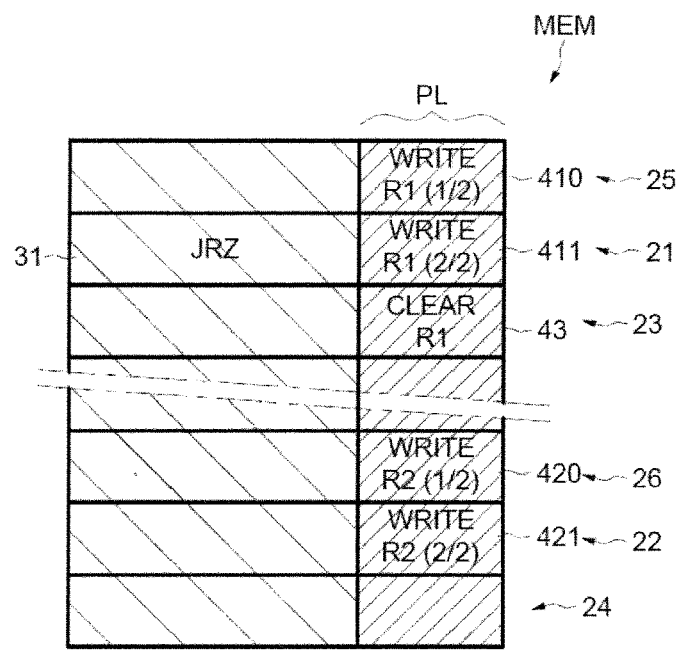
FIG. 4 is a diagram of a memory of a data processing system illustrating memory locations according to an embodiment.

According to another embodiment illustrated in FIG. 4, the first monitoring instruction 41 has a size larger than the size of the free part PL of the first memory location, for example a size of eight bits. The first monitoring instruction 41 is therefore separated into two parts 410 and 411. The first part 410 is stored in the free part of a fifth memory location 25 preceding the first memory location 21, and the second part 411 is stored in the free part PL of the first memory location 21. The same is true for the second monitoring instruction 42, a first part 420 of which is stored in the free part PL of a sixth memory location 26 preceding the second memory location 22, and a second part 421 of which is stored in the free part PL of the second memory location 22.

Figure 5:
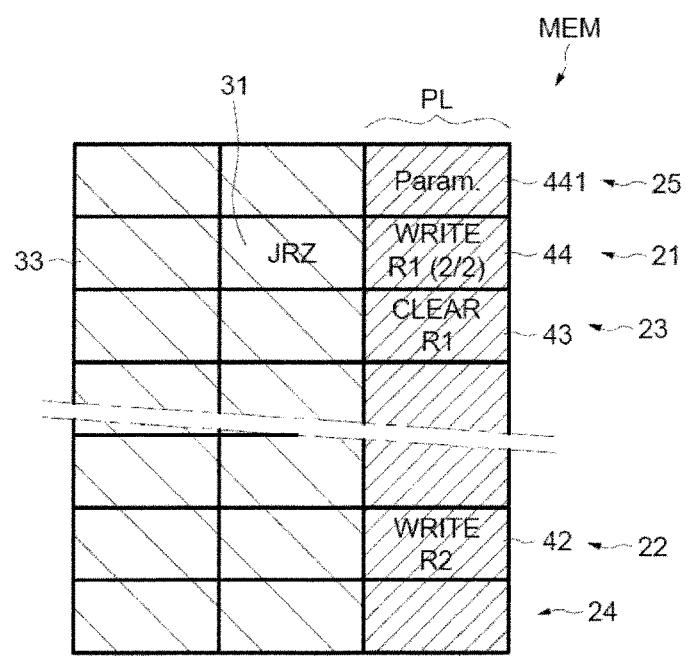
FIG. 5 is a diagram of a memory of a data processing system illustrating memory locations according to an embodiment.

According to another embodiment illustrated in FIG. 5, each memory location 2 can receive two instruction words 3 of the program code, for example instruction words of fourteen bits each. The first memory location 21 includes, in addition to the first instruction word 31, a third program code instruction 33, any given instruction whose execution is not being monitored. The first memory location 21 also includes, in its free part PL, a fourth monitoring instruction 44 relating to the first instruction word 31 of program code, for example an instruction of eight bits.

The fifth memory location 25 preceding the first memory location 21 includes a parameter 441 which completes the fourth monitoring instruction 44. The parameter 441 indicates to which of the two instructions 31 or 33 the fourth monitoring instruction 44 relates.

It should be noted that the embodiments and their implementations presented here are in no way limiting. Notably, it would be perfectly possible to envision the monitoring unit AM to be a hardware module incorporated into the CPU processor.

That which is claimed is:

1. A method for monitoring execution of a program code stored in a memory and generating an error code in response to an erroneous execution of the program code, the method comprising:
   storing a first instruction of the program code in a first part of a first memory location of a memory;
   storing a first monitoring instruction relating to monitoring of the first instruction of the program code in a second part of the first memory location different from the first part of the first memory location;
   simultaneously extracting the first instruction of the program code and the first monitoring instruction from the first memory location, wherein the first instruction of the program code is extracted via a first portion of a data bus to a first processor coupled to the memory by the data bus, and wherein the first monitoring instruction is extracted by a second portion of the data bus to a second processor different from the first processor and coupled to the memory by the data bus;

executing, in parallel, the first instruction of the program code using the first processor and the first monitoring instruction using the second processor, wherein executing the first monitoring instruction comprises writing a reference value into a first register of the second processor and commencing a countdown of a counter of the second processor at a cadence of a clock signal;

comparing, by a comparator of the second processor and at an end of the countdown of the counter, the reference value stored in the first register with a value stored in a second register of the second processor; and determining, by the second processor, whether an erroneous execution of the first instruction of the program code has occurred based on a comparison of the reference value stored in the first register with the value stored in the second register.

2. The method according to claim 1, wherein the first monitoring instruction has a size larger than a size of the second part of the first memory location, and wherein storing the first monitoring instruction relating to monitoring of the first instruction of the program code in the portion part of the first memory location comprises:

storing a first part of the first monitoring instruction in the second part of the first memory location; and storing a second part of the first monitoring instruction in a second part of another memory location different from and preceding the first memory location.

3. The method according to claim 2, wherein a size of the second part of the another memory location is equal to a size of the second part of the first memory location.

4. The method according to claim 1, wherein the first instruction of the program code comprises a plurality of instruction words stored in the first part of the first memory location, and wherein the method further comprises:

storing a parameter, indicative of which of the plurality of instruction words the first monitoring instruction relates to, in a second part of another memory location different from and preceding the first memory location.

5. The method according to claim 1, further comprising:

storing a second instruction of the program code in a first part of a second memory location different from the first memory location; and storing a second monitoring instruction relating to monitoring of the first instruction of the program code in a second part of the second memory location different from the first part of the second memory location, wherein the first instruction of the program code comprises a skip instruction pointing to the second memory location.

6. The method according to claim 5, wherein executing the first instruction of the program code using the first processor comprises jumping execution of the program code to the second memory location while continuing the countdown of the counter of the second processor at the cadence of the clock signal.

7. The method according to claim 6, further comprising:

simultaneously extracting the second instruction of the program code and the second monitoring instruction from the second memory location, wherein the second instruction of the program code is extracted via the first portion of the data bus to the first processor, and wherein the second monitoring instruction is extracted by the second portion of the data bus to the second processor; and executing, in parallel, the second instruction of the program code using the first processor and the second monitoring instruction using the second processor, wherein executing the second monitoring instruction comprises writing the reference value into the second register of the second processor.

8. The method according to claim 1, further comprising generating, by the second processor, an error code in response to the reference value in the first register being different from the value stored in the second register.

9. A device for monitoring a program code stored in a memory and generating an error code in response to an erroneous execution of the program code, the device comprising:

a memory having a plurality of memory location, wherein a first part of a first memory location of the memory is configured to store a first instruction of the program code, and wherein a second part of the first memory location different from the first part of the first memory location is configured to store a first monitoring instruction relating to monitoring of the first instruction of the program code;

a first processor coupled to the memory by a data bus, wherein the first processor is configured to extract the first instruction of the program code from the first part of the first memory location via a first portion of the data bus and to execute the first instruction of the program code; and a second processor different from the first processor and coupled to the memory by the data bus, wherein the second processor is configured to extract the first monitoring instruction from the second part of the first memory location via a second portion of the data bus simultaneously to extraction of the first instruction of the program code and to execute the first monitoring instruction in parallel to execution of the first instruction of the program code, wherein the second processor comprises:

a first register configured to store a reference value written by the second processor in response to execution of the first instruction of the program code;

a counter configured to commence a countdown at a cadence of a clock signal in response to execution of the first instruction of the program code;

a second register configured to store a value written by the second processor in response to execution of other instructions of the program code; and a comparator configured to compare the reference value stored in the first register with the value stored in the second register, wherein the second processor is further configured to determine whether an erroneous execution of the first instruction of the program code has occurred based on a comparison of the reference value stored in the first register with the value stored in the second register.

10. The device according to claim 9, wherein the first monitoring instruction has a size larger than a size of the second part of the first memory location, and the memory is configured to store a first part of the first monitoring instruction in the second part of the first memory location and to store a second part of the first monitoring instruction in a second part of another memory location different from and preceding the first memory location.

11. The device according to claim 10, wherein a size of the second part of the another memory location is equal to a size of the second part of the first memory location.

12. The device according to claim 9, wherein the first instruction of the program code comprises a plurality of instruction words stored in the first portion part of the first memory location, and wherein the memory is further configured to store a parameter, indicative of which of the plurality of instruction words the first monitoring instruction relates to, in a second part of another memory location different from and preceding the first memory location.

13. The device according to claim 9, wherein the memory is further configured to store a second instruction of the program code in a first part of a second memory location different from the first memory location and to store a second monitoring instruction relating to monitoring of the first instruction of the program code in a second part of the second memory location different from the first part of the second memory location, wherein the first instruction of the program code comprises a skip instruction pointing to the second memory location.

14. The device according to claim 13, wherein the first processor is configured to execute the first instruction of the program code by jumping execution of the program code to the second memory location while continuing the countdown of the counter of the second processor at the cadence of the clock signal.

15. The device according to claim 9, wherein the second processor is further configured to generate an error code in response to the reference value in the first register being different from the value stored in the second register.

16. A non-transitory computer readable medium comprising computer executable instructions for monitoring execution of a program code stored in a memory and generating an error code in response to an erroneous execution of the program code, the computer executable instructions comprising instructions for:
   storing a first instruction of the program code in a first part of a first memory location of a memory;
   storing a first monitoring instruction relating to monitoring of the first instruction of the program code in a second part of the first memory location different from the first part of the first memory location;
   simultaneously extracting the first instruction of the program code and the first monitoring instruction from the first memory location, wherein the first instruction of the program code is extracted via a first portion of a data bus to a first processor coupled to the memory by the data bus, and wherein the first monitoring instruction is extracted by a second portion of the data bus to a second processor different from the first processor and coupled to the memory by the data bus;
   executing, in parallel, the first instruction of the program code using the first processor and the first monitoring instruction using the second processor, wherein executing the first monitoring instruction comprises writing a reference value into a first register of the second processor and commencing a countdown of a counter of the second processor at a cadence of a clock signal;
   comparing, by a comparator of the second processor and at an end of the countdown of the counter, the reference value stored in the first register with a value stored in a second register of the second processor; and
   determining, by the second processor, whether an erroneous execution of the first instruction of the program code has occurred based on a comparison of the reference value stored in the first register with the value stored in the second register.

17. The non-transitory computer readable medium according to claim 16, wherein the first monitoring instruction has a size larger than a size of the second part of the first memory location, and wherein storing the first monitoring instruction relating to monitoring of the first instruction of the program code in the second part of the first memory location comprises:
   storing a first part of the first monitoring instruction in the second part of the first memory location; and
   storing a second part of the first monitoring instruction in a part of another memory location different from and preceding the first memory location.

18. The non-transitory computer readable medium according to claim 16, wherein the first instruction of the program code comprises a plurality of instruction words stored in the first part of the first memory location, and wherein the computer executable instructions further comprises instructions for:
   storing a parameter, indicative of which of the plurality of instruction words the first monitoring instruction relates to, in a second part of another memory location different from and preceding the first memory location.

19. The non-transitory computer readable medium according to claim 16, wherein the computer executable instructions further comprises instructions for:
   storing a second instruction of the program code in a first part of a second memory location different from the first memory location; and
   storing a second monitoring instruction relating to monitoring of the first instruction of the program code in a second part of the second memory location different from the first part of the second memory location, wherein the first instruction of the program code comprises a skip instruction pointing to the second memory location.

20. The non-transitory computer readable medium according to claim 16, wherein the computer executable instructions further comprises instructions for generating, by the second processor, an error code in response to the reference value in the first register being different from the value stored in the second register.

* * * * *

UNITED STATES PATENT AND TRADEMARK OFFICE
CERTIFICATE OF CORRECTION

PATENT NO. : 10,162,728 B2  
APPLICATION NO. : 15/222368  
DATED : December 25, 2018  
INVENTOR(S) : Albert Martinez Page 1 of 1

It is certified that error appears in the above-identified patent and that said Letters Patent is hereby corrected as shown below:

In the Claims

In Column 7, Line 26, Claim 2, delete "the portion part" and insert --the second part--.

In Column 9, Line 6, Claim 12, delete "portion".

Signed and Sealed this  
Second Day of April, 2019

Andrei Iancu  
*Director of the United States Patent and Trademark Office*